US012607968B2

(12) United States Patent
Sano et al.

(10) Patent No.: US 12,607,968 B2
(45) Date of Patent: Apr. 21, 2026

(54) ELECTRONIC DEVICE AND ELECTRONIC TIMEPIECE

(71) Applicant: CASIO COMPUTER CO., LTD., Tokyo (JP)

(72) Inventors: Takashi Sano, Fussa (JP); Takeshi Matsue, Kokubunji (JP); Masashi Sawai, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 294 days.

(21) Appl. No.: 18/372,633

(22) Filed: Sep. 25, 2023

(65) Prior Publication Data

US 2024/0103450 A1 Mar. 28, 2024

(30) Foreign Application Priority Data

Sep. 26, 2022 (JP) ................................ 2022-152061

(51) Int. Cl.
*G04G 17/04* (2006.01)
*G04G 19/00* (2006.01)
*G04G 21/04* (2013.01)

(52) U.S. Cl.
CPC ............. *G04G 17/04* (2013.01); *G04G 19/00* (2013.01); *G04G 21/04* (2013.01)

(58) Field of Classification Search
CPC ........ G04G 17/04; G04G 19/00; G04G 21/04; G04C 10/02; H01Q 1/273; H01Q 1/40; H01Q 1/52; H01Q 7/00; G04R 60/10
See application file for complete search history.

(56) References Cited

U.S. PATENT DOCUMENTS 9,665,071 B2 * 5/2017 Fujisawa ................ G04R 60/12
10,209,679 B2 * 2/2019 Fujisawa ................ G04G 21/04

FOREIGN PATENT DOCUMENTS

| | | | |
|---|---|---|---|
| JP | 2001-289970 | A | 10/2001 |
| JP | 2011-160055 | A | 8/2011 |
| JP | 2015-175673 | A | 10/2015 |
| JP | 2018-080991 | A | 5/2018 |
| JP | 2019-032221 | A | 2/2019 |
| JP | 2019-056616 | A | 4/2019 |

OTHER PUBLICATIONS

JPO: Application No. 2022-152061; Notice of Reasons for Refusal dated Sep. 3, 2024.

* cited by examiner

*Primary Examiner* — Edwin A. Leon
(74) *Attorney, Agent, or Firm* — Fitch, Even, Tabin & Flannery LLP

(57) ABSTRACT

An electronic device includes: a circuit board; an antenna; a solar panel; and at least one contact member. The antenna has an annular shape in a plan view from a first direction, has at least an outer peripheral edge and an inner peripheral edge, and has a notch at the inner peripheral edge. The at least one contact member electrically connects the solar panel and the circuit board. The solar panel, the antenna, and the circuit board are arranged in order from the first direction. The contact member is at a position corresponding to the notch.

16 Claims, 11 Drawing Sheets

ELECTRONIC DEVICE AND ELECTRONIC TIMEPIECE

REFERENCE TO RELATED APPLICATIONS

This application is based upon and claims the benefit of priority from the prior Japanese Patent Application No. 2022-152061, filed on Sep. 26, 2022, the entire contents of which are incorporated herein by reference.

TECHNICAL FIELD

This disclosure relates to an electronic device and an electronic timepiece.

DESCRIPTION OF RELATED ART

Conventionally, electronic devices such as electronic timepieces having antennas for GPS reception are known. The members (antenna elements) that make up the antenna are generally made of metal, and there are concerns about oxidation and corrosion when the antenna is exposed to the open air.

For this reason, the antenna is preferably accommodated inside the electronic device. For example, JP2015-175673A discloses a configuration in which an antenna is accommodated inside a case of a timepiece (electronic timepiece).

SUMMARY OF THE INVENTION

In order to solve the problems of the conventional technology, the electronic device according to an embodiment of the present disclosure includes:

a circuit board;

an antenna that has an annular shape in a plan view from a first direction, has at least an outer peripheral edge and an inner peripheral edge, and has at least one of a notch and a hole;

a solar panel; and at least one contact member that electrically connects the solar panel and the circuit board, wherein the solar panel, the antenna, and the circuit board are arranged in order from the first direction, and wherein the contact member is at a position corresponding to the at least one of the notch and the hole.

BRIEF DESCRIPTION OF DRAWINGS

The accompanying drawings are not intended as a definition of the limits of the invention but illustrate embodiments of the invention, and together with the general description given above and the detailed description of the embodiments given below, serve to explain the principles of the invention, wherein.

DETAILED DESCRIPTION

With reference to FIG. 1 to FIG. 16, an embodiment of an electronic device and an electronic timepiece according to the present disclosure will be described. In the present embodiment described in the following example, the electronic device is an electronic timepiece that has an antenna.

Although various limitations technically preferable for carrying out the present disclosure are put on the embodiment(s) described below, the technical scope of the present disclosure is not limited to the embodiment(s) below or illustrated examples.

Configuration

Figure 1:
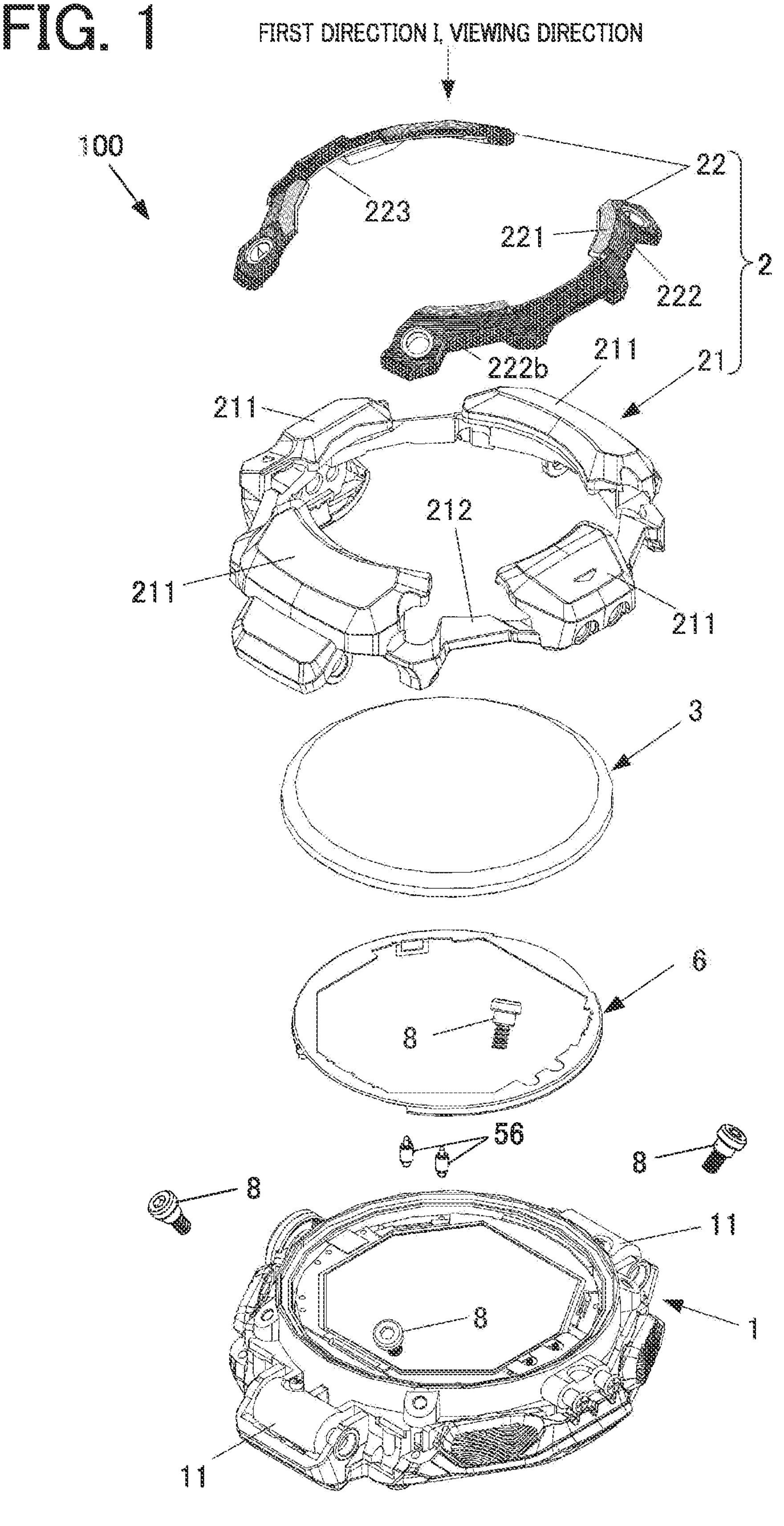
FIG. 1 is an exploded perspective view of main parts of a timepiece of an embodiment.
Figure 2:
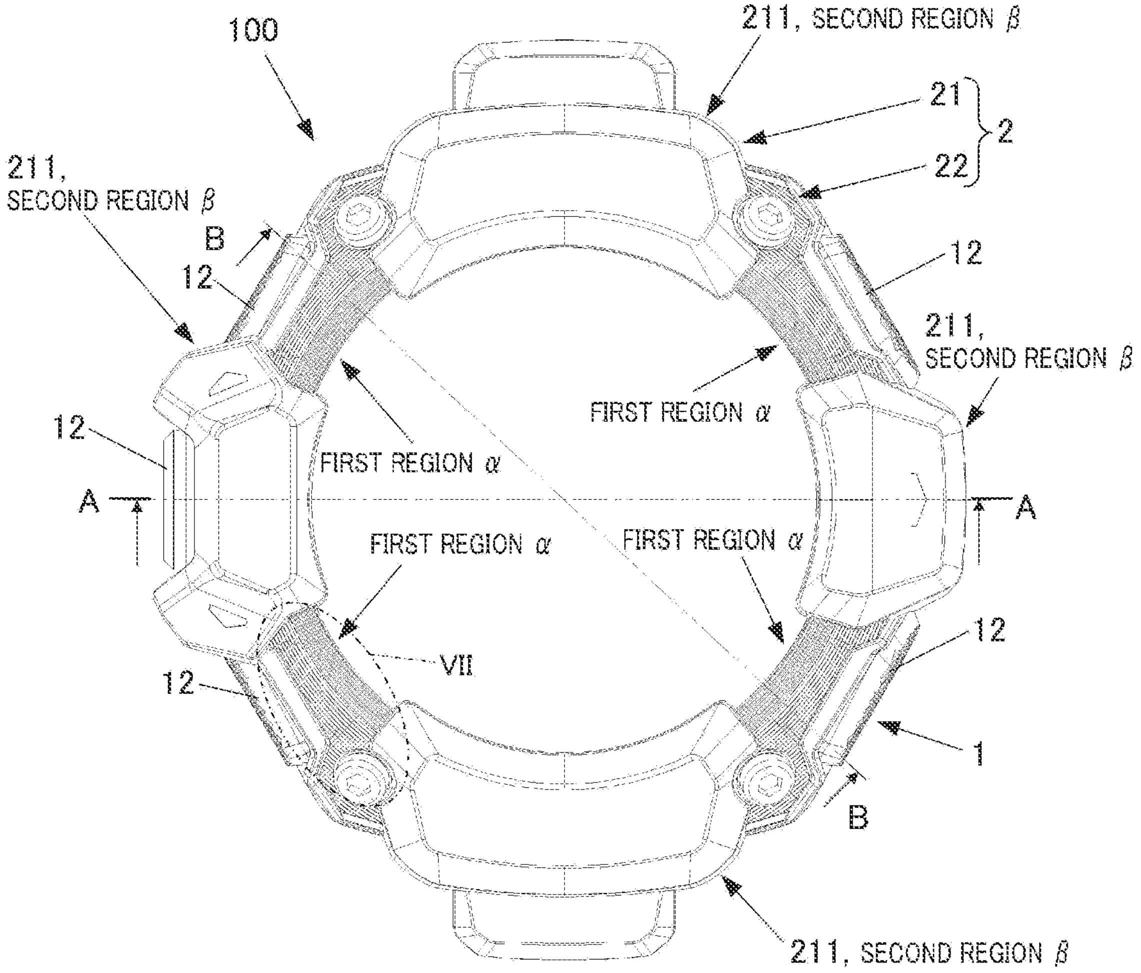
FIG. 2 is a front view of the timepiece of the embodiment.
Figure 3:
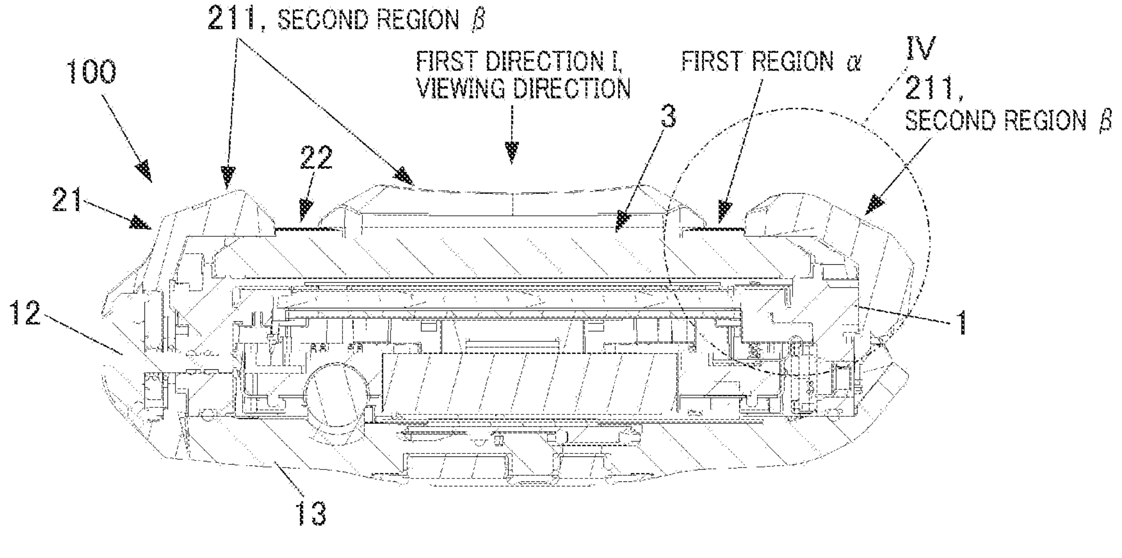
FIG. 3 is a cross-sectional view of the timepiece along A-A line of the embodiment.
Figure 4:
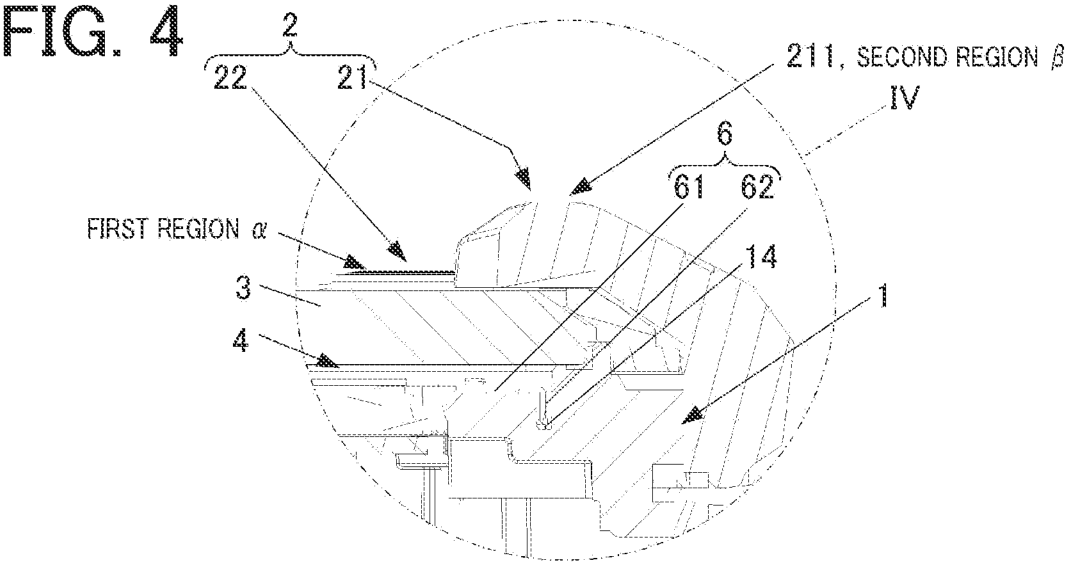
FIG. 4 is an enlarged cross-sectional view of main parts of a portion IV in FIG. 3.
Figure 5:
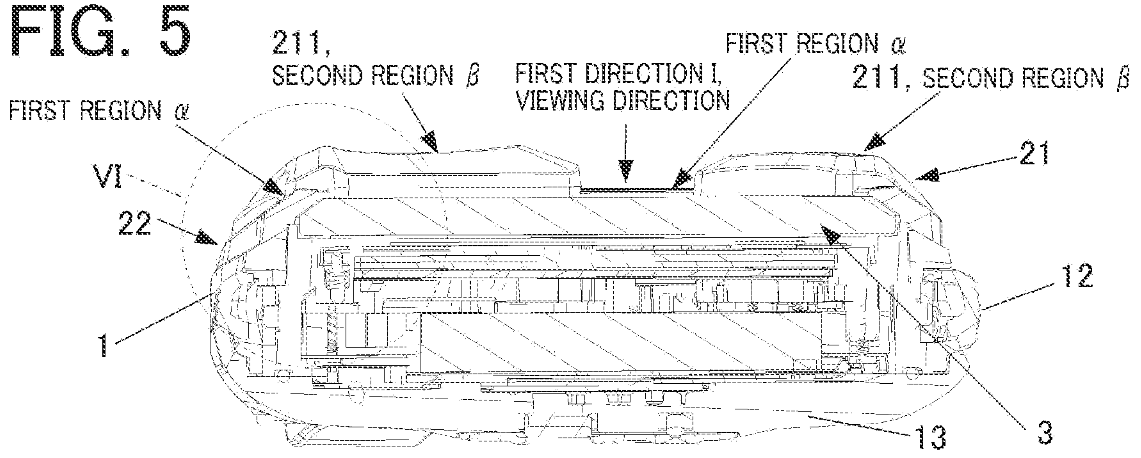
FIG. 5 is a cross-sectional view of the timepiece of the embodiment along B-B line.
Figure 6:
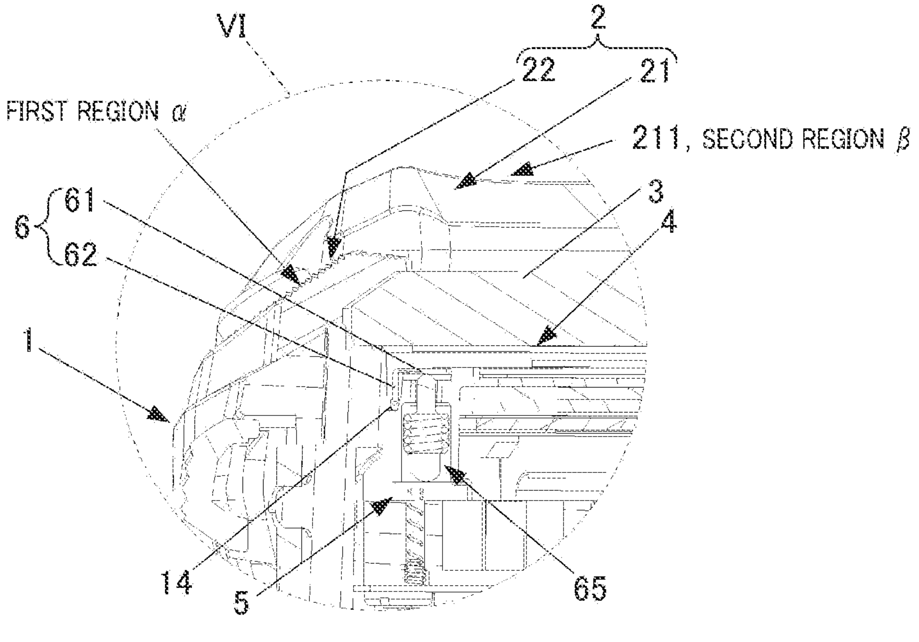
FIG. 6 is an enlarged cross-sectional view of main parts of a portion VI in FIG. 5.

FIG. 1 is an exploded perspective view of main parts of an electronic timepiece (hereinafter simply referred to as a "timepiece") as an electronic device of the present embodiment. FIG. 2 is a front view of the timepiece illustrated in FIG. 1. FIG. 3 is a schematic cross-sectional view of main parts along the A-A line in FIG. 2. FIG. 4 is an enlarged view of the portion IV enclosed by a dashed line in FIG. 3. FIG. 5 is a schematic cross-sectional view of main parts along the B-B line in FIG. 2. FIG. 6 is an enlarged view of the portion VI enclosed by a dashed line in FIG. 5.

As illustrated in FIG. 1 to FIG. 6, the timepiece 100 of the present embodiment has a device case 1.

The device case 1 of the present embodiment is formed in the shape of a short tube that is open at the top and the bottom (a front side and a back side of the timepiece 100). The hollow space inside the device case 1 constitutes a space to house various parts.

The device case 1 is formed of a relatively hard synthetic resin such as, for example, a biomass plastic, engineering plastic, or super engineering plastic. The materials used to form the device case 1 are not limited to those exemplified here, but preferably include various resin materials having a high relative permittivity, as described later.

The device case 1 has a pair of band attachment portions 11 (see FIG. 1) where a band (not shown) is attached at the top and bottom positions (at the 12 o'clock and 6 o'clock positions of an analog timepiece) on the outer surface in FIG. 2.

Also, on the left and right sides of the device case 1 in FIG. 2, there are various operation buttons 12 (pushbuttons, crowns, etc.) for various input operations by a user.

As illustrated in FIG. 3 and FIG. 5, a back cover 13 closes an opening of the device case 1 on the back side (a non-visible side of the timepiece). The back cover 13 may be formed integrally with the device case 1.

The device case 1 has a bezel 2 as an exterior member surrounding the opening on the front surface side of the device case 1 (a visible side of the timepiece). The bezel 2 is fixed to the device case 1 with a screw(s) 8, for example.

The bezel 2 is an almost annular member when the timepiece 100 is viewed from the viewing side. The direction from the visible side to the non-visible side of the timepiece 100 is hereinafter referred to as the "first direction I". The bezel 2 has a first region α having a layer of metal discontinuously deposited on a base including a resin material at least on the front surface, and a second region β formed so as to include a resin material (without discontinuous deposition of metal).

In the present embodiment, the bezel 2 includes a first bezel 21 formed of a resin material such as urethane, for example, and a second bezel 22 having, at least on the front surface, a layer where a metal is discontinuously deposited on a base including a resin material such as urethane. The portion of the second bezel 22 exposed on the front surface (visible side surface) is the first region α, and the portion of the second bezel 22 covered with the first bezel 21 and not appearing on the front surface (visible side surface) is the second region 13.

Specifically, the first bezel 21 has a protrusion 211 that protrudes more than the other portions (the main body 212 of the first bezel 21) at each of 3 o'clock, 6 o'clock, 9 o'clock, and 12 o'clock positions of an analog timepiece along the peripheral edge of the bezel 2, as illustrated in FIG. 1 and the like. The protrusion 211 protrudes more than the main body 212 at least in the thickness direction of the timepiece 100 (upward in FIG. 3, etc.) and in the radial outward direction of the bezel 2.

All or part of the protrusion 211 can be attached to and detached from the main body 212 of the first bezel 21.

In the present embodiment, for example, the second bezel 22 is arranged on top of the main body 212 with all or part of the protrusion 211 removed from the main body 212. By subsequently attaching the removed protrusion 211 to the main body 212, the integrated bezel 2 is formed with the second bezel 22 sandwiched between the main body 212 and the protrusion 211 of the first bezel 21.

The bezel 2 formed with a resin material such as urethane can be lighter and formed more freely than by metal fabrication. In addition, when the bezel 2 of a resin material is provided as an exterior member of the timepiece 100, the shock resistance of the timepiece 100 is also improved compared to a timepiece having a bezel formed of a metal material.

On the front surface of the second bezel 22, a metal such as In (indium) is discontinuously deposited, for example. By the discontinuous deposition (thin layer deposition) of indium or the like, a metallic appearance is achieved, and spaces are created between the metal particles. As a result, the bezel 2 including the second bezel 22 do not block the radio waves even when arranged above an antenna 6 (see FIG. 1, etc.), for example. A transparent coating of resin or the like may be further formed on the discontinuously deposited metal layer. In this case, further glossiness and scratch resistance can be achieved. In (indium) alloys sometimes peel off when struck or rubbed by an object. In this regard, a transparent coating of resin or the like formed on the front surface can prevent the metal layer of the discontinuous deposited In (indium alloy) or the like from peeling off even when the second bezel 22 is struck by surrounding objects during use. This ensures that the beautiful metallic appearance is maintained for a long time.

The metal to be discontinuously deposited is not limited to In (indium), but may be Sn (tin), various alloys, and the like.

The layer of discontinuously deposited metal may be formed on the entire surface of the second bezel 22, or only on the portion that may be exposed to the outside.

The portion that may be exposed to the outside is the upper surface 221 and side surface 222 of the second bezel 22. The discontinuous deposition of metal may be performed on the entire upper surface 221 and the side surface 222, however, the portion of the upper surface 221 and the side surface 222 of the second bezel 22 that is sandwiched between the main body 212 and the protrusion 211 of the first bezel 21 is not exposed to the outside in an assembled state. Therefore, discontinuous deposition of metal may not be performed at such portions.

For example, FIG. 3 illustrates a cross-section along the A-A line in FIG. 2 in which the second region β is formed by the protrusion 211 of the first bezel 21 overlying the second bezel 22. As illustrated in FIG. 3 and FIG. 4 and described above, the protrusion 211 of the first bezel 21 is arranged outside in the second region R, such that the second bezel 22 is sandwiched between the main body 212 and the protrusion 211 of the first bezel 21 and is not exposed outside. Therefore, at such a portion, discontinuous deposition of metal may not be performed on the upper surface 221 (front surface) and side surface 222 as well as on the back surface 223 of the second bezel 22.

Thus, by not performing discontinuous deposition on the non-visible portion, the metal material to be deposited can be saved. Further, when discontinuous deposition is not performed on the non-visible portion (back surface 223, etc.), work process is simplified because the deposition can be performed with the second bezel 22 arranged on a table with the back surface 223 and the like facing down, for example.

In contrast, FIG. 5 illustrates a cross-section along the B-B line in FIG. 2 in which the first region α where the upper surface 221 (front surface) and the side surface 222 of the second bezel 22 are exposed to the visible side.

The first region α and the second region β are arranged alternately along the peripheral direction of the bezel 2.

Specifically, as illustrated in FIG. 2, in the present embodiment, the protrusions 211 constituting the second regions β are almost equally spaced along the peripheral direction of the bezel 2, and the first regions α are arranged between the protrusions 211 constituting the second regions β. The protrusions 211 constituting the second regions β are formed so that their upper surface height is at least higher than the upper surface height of the first regions α, where the second bezel 22 is exposed. Therefore, the exposed second bezel 22 can be protected from external shocks and the like, and the metallic appearance of the bezel 22 can be prevented from being damaged.

In the present embodiment, the upper surface 221 and the side surface 222 that may be exposed to the outside in the second bezel 22 are V-grooved (cutting mark (record) finish, hairline finish, etc.), for example, and have concentric circular grooves 22*a*. This can produce a more metallic texture when the metal is discontinuously deposited.

Figure 7A:
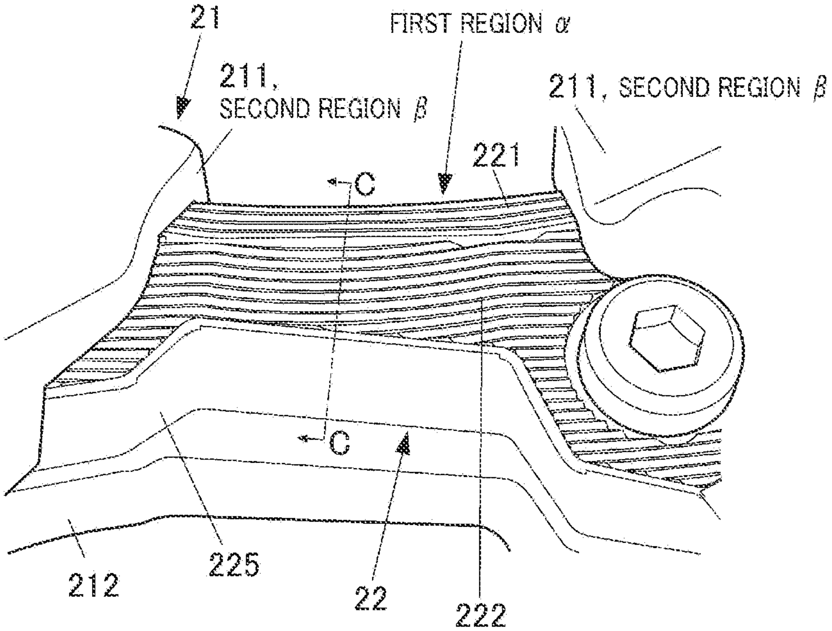
FIG. 7A is an enlarged perspective view of main parts of a portion VII in FIG. 2.
Figure 7B:
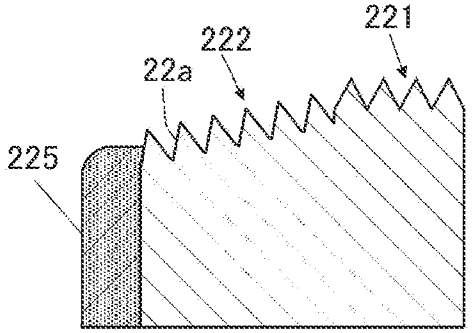
FIG. 7B is a schematic cross-sectional view along C-C line in FIG. 7A.

FIG. 7A is an enlarged view of the portion VII surrounded by a dashed dotted line in FIG. 2. FIG. 7B is a cross-section along the C-C line in FIG. 7A. FIG. 7B is a schematic illustration of the cross-section at the C-C line and does not accurately represent the shape, number, depth, etc. of the grooves 22*a*.

When the bezel 2 (second bezel 22) has the concentric circular V-grooves, an edge of the cross-section along the radial direction of the bezel 2 has unevenness, which deteriorates the appearance and touch feeling of the bezel 2. Therefore, in the present embodiment, as illustrated in FIG. 7A and FIG. 7B, a wall 225 is provided to prevent unevenness from appearing on the exposed edge. The wall 225 walls around the V-grooved portion (such as the side surface 222 of the second bezel 22 where the grooves 22*a* are formed) so that the V-grooves are not exposed at the outer edge. The method of V-grooving to form the grooves 22*a* and forming the wall 225 is not particularly limited, but for example, molding can be performed using a mold having a shape corresponding to the grooves 22*a* and the wall 225.

FIG. 7B illustrates an example of the wall 225 having a height enough to hide about half of the cross section of the V-grooves of the groove 22*a*. However, the height of the wall 225 is not limited to this. For example, the wall may be high enough to hide the entire cross section of the V-groove.

In the present embodiment, the second bezel 22 includes two members as illustrated in FIG. 1. However, the second bezel 22 is only required to be sandwiched between the main body 212 and the protrusion 211 of the first bezel 21, and may be a single member that is almost annular, C-shaped, U-shaped, and the like when viewed from the first direction I (from the visible side, see FIG. 1, FIG. 3, and the like). Alternatively, the second bezel 22 may include more than two smaller members, such as four members.

The protrusions 211 are not limited to being arranged in the locations illustrated here. The protrusions 211 are preferably almost equally spaced along the peripheral direction to ensure that the exposed portion of the second bezel 22 having a metallic appearance (first region α) is protected. The protrusions 211 is only required to be arranged in multiple locations along the peripheral direction of the bezel 2, for example, they may be arranged in three locations. The protrusions 211 do not have to be detachable from the main body 212. The protrusions 211 do not have to be individually attachable to and detachable, from the main body 212, but may be connected together and attachable to and detachable from the main body 212 as a single unit.

In the present embodiment, the bezel 2 has the first bezel 21, on which no metal is discontinuously deposited, in addition to the second bezel 22 having the metallic appearance, and the first bezel 21 protects the portion (first region α) where the metallic appearance is exposed. However, the bezel 2 may not have the first bezel 21 as long as the discontinuously deposited metal layer of indium alloy or the like has improved adhesion and is difficult to peel off.

In the present embodiment, the bezel 2 that surrounds the opening on the front surface side of the device case 1 is made of a resin material 2 such as urethane. Therefore, when the timepiece 100 receives a shock from the outside, the bezel 2 absorbs the shock and effectively prevents the device case 1, timepiece movement accommodated inside the device case 1 (for example, a circuit board 5 and a liquid crystal panel unit 7 described later and various motors not shown in the drawing), and the like from being damaged.

In the example described in the present embodiment, the member constituting the second regions β (the first bezel 21 with protrusions 211) and the member constituting the first regions α (the second bezel 22 with metallic texture at least on the exposed portions) are separate members. However, the bezel with the second regions β and the first regions α may be formed integrally and partially processed to have a metallic texture.

The opening on the front surface (the visible side of the timepiece) of the device case 1 is closed with a windshield 3. The windshield 3 is a transparent member made of, for example, a glass material, a transparent resin material, or the like. The windshield 3 is preferably attached to the device case 1 via a resin waterproof ring or the like. Thereby, waterproofness (airtightness) in the device case 1 can be ensured.

Figure 8:
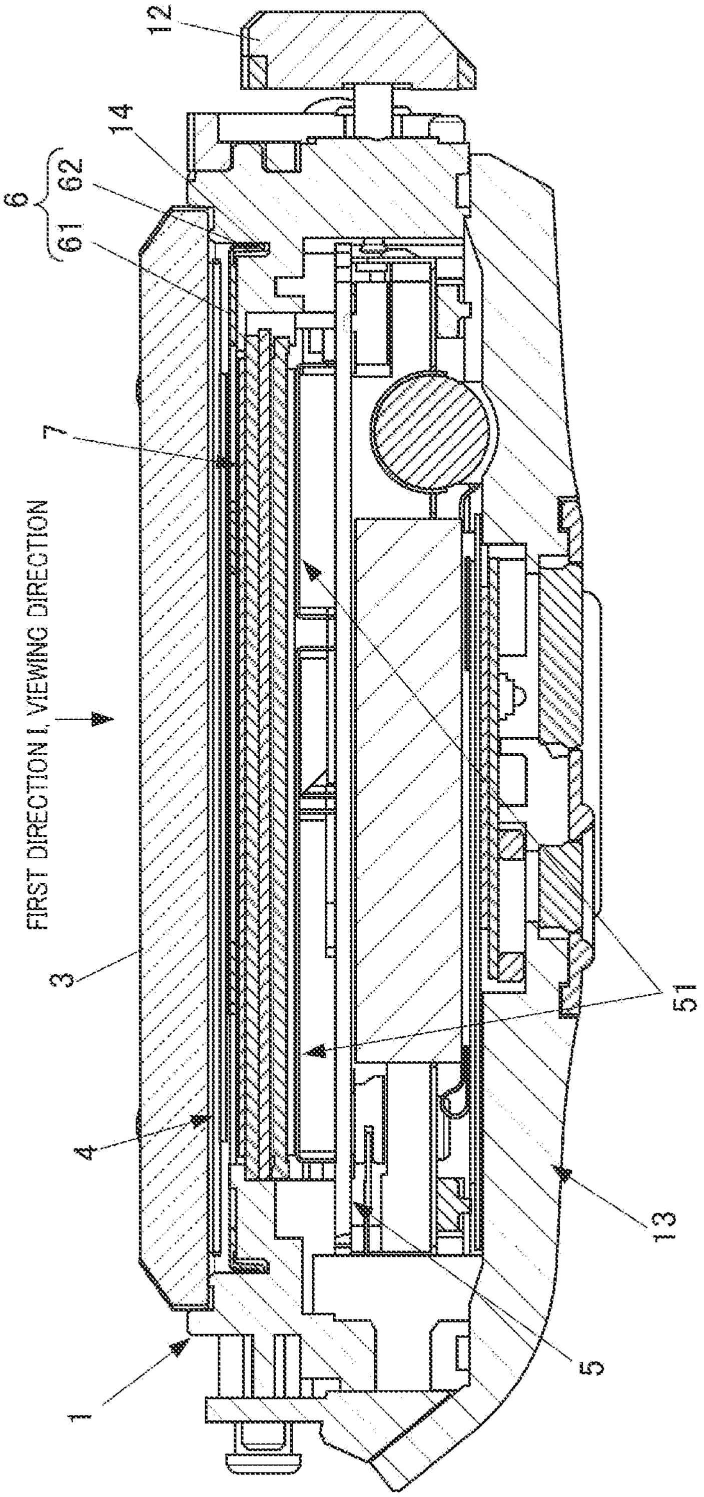
FIG. 8 is a cross-sectional view of main parts with a bezel removed from the timepiece of the embodiment.

FIG. 8 is a cross-sectional view of the timepiece with the bezel 2 removed.

In the present embodiment, as illustrated in FIG. 8, a solar panel 4 is affixed to the back surface side of the windshield 3 (that is, the side arranged inside the device case 1).

The solar panel 4 is a photovoltaic cell that receives light to generate electric power. The electric power generated by the photovoltaic generation by the solar panel 4 is stored in the secondary battery accommodated in the device case 1 and is used to power various parts of the timepiece 100.

In the present embodiment, the solar panel 4, the antenna 6 (described later), and the circuit board 5 are arranged in this order from the first direction I, the thickness direction of the timepiece 100 that is almost orthogonal to the surface of the circuit board 5. That is, the antenna 6 is in the first direction I of the solar panel 4, and the circuit board 5 is in the first direction I of the antenna 6. The solar panel 4 is arranged so as to overlap the antenna 6 at least in part in a plan view in the first direction I.

Figure 9:
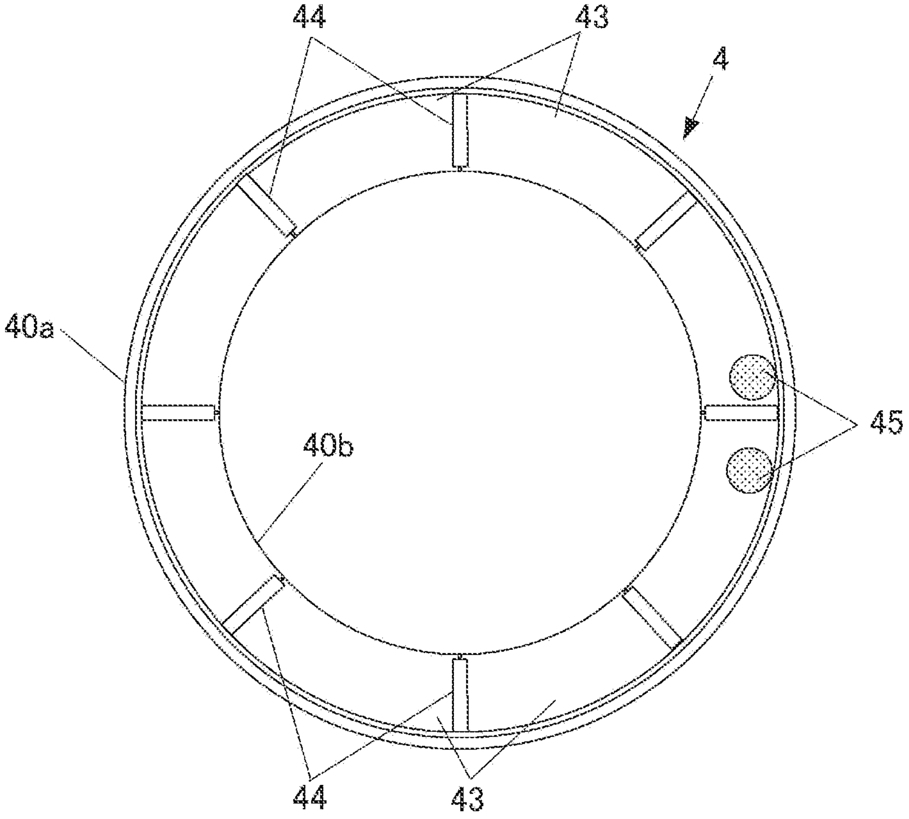
FIG. 9 is a plan view of a solar panel of the present embodiment.

FIG. 9 is a plan view of the solar panel in the present embodiment.

As illustrated in FIG. 9, the solar panel 4 of the present embodiment is a hollow circular (ring-shaped) panel having at least an outer peripheral edge 40*a* and an inner peripheral edge 40*b* in the plan view in the first direction I.

In the present embodiment, the solar panel 4 includes a plurality of cells 43 with division lines 44 between them and each having a shape of an almost annular sector. The division lines 44 are along the radial direction of the ring-shaped solar panel 4 and almost equally spaced along the peripheral direction of the solar panel 4. The solar panel 4 includes eight cells 43 in the illustrated example, but the number of cells 43 constituting the solar panel 4 is not particularly limited. The plurality of cells 43 constituting the solar panel 4 are connected in series and are further connected to the circuit board 5 (see FIG. 8, FIG. 10, etc.) at the contact portion 45 described later.

Figure 10:
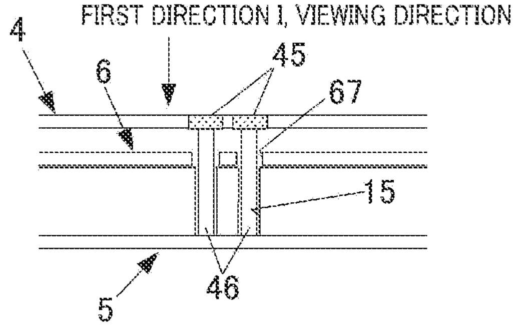
FIG. 10 is a side view of main parts illustrating a configuration of a connection between the solar panel and a circuit board of the present embodiment.

FIG. 10 is an explanatory diagram schematically illustrating a connection between the solar panel 4 and the circuit board 5.

As illustrated in FIG. 10, the solar panel 4 and the circuit board 5 are connected with at least one board-panel contact member 46 (panel contact member) between the contact portion 45 of the solar panel 4 and a connection terminal for solar panel (pad, not shown in the drawings) of the circuit board 5. In the present embodiment, two board-panel contact members 46 are provided as illustrated in FIG. 10.

The board-panel contact members 46 are coil springs, for example, each having one end in electrical contact with the solar panel 4 and the other end in electrical contact with the circuit board 5.

As illustrated in FIG. 8 and the like, the antenna 6 is arranged between the solar panel 4 and the circuit board 5 in the present embodiment. The board-panel contact members 46 are arranged so as to overlap the solar panel 4, the antenna 6, and the circuit board 5 in the plan view from the first direction I.

Specifically, as schematically illustrated in FIG. 10, holes 15 penetrating the device case 1 from top to bottom are formed corresponding to the positions where the board-panel contact members 46 are arranged. The board-panel contact members 46 are inserted into these holes 15 and are positioned and held so that their respective ends are in contact with the solar panel 4 and the circuit board 5. As described later, the antenna 6 has notches 67 to avoid the portions where the board-panel contact members 46 are arranged.

The antenna 6 in the present embodiment is, for example, a GPS antenna that can receive GNSS (GPS/GLONASS/QZSS/SBAS) signals from satellites. Hereafter, the term "GPS" includes not only GPS but also other systems such as GLONASS. The GPS satellite has an atomic clock and transmits data including time information based on the atomic clock. The timepiece 100 receives GNSS (GPS) signals transmitted from the GPS satellite with the antenna 6 to obtain extremely accurate time information at any receiving point on the earth.

The antenna 6, which is a GPS antenna that receives GNSS (GPS) signals, needs to be able to receive right-handed polarization among circularly polarized waves.

GPS satellites transmit GNSS (GPS) signals in frequencies in the L1 band (around 1.6 GHz), the L5 band (around 1.2 GHz), and the like. Therefore, the L1 band, L5 band, etc. are desired frequency bands for GPS antennas that receive GNSS (GPS) signals. The antenna 6 is desired to have high antenna performance (antenna gain corresponding to right-handed polarization in particular) for these frequency bands.

Figure 11A:
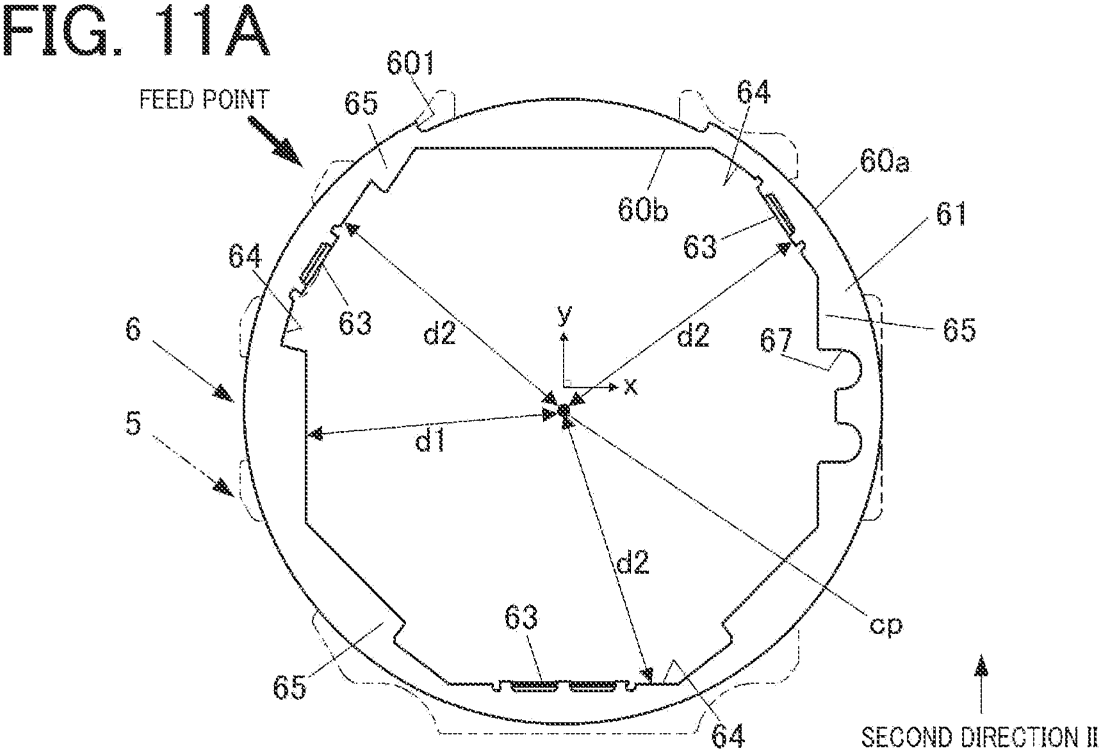
FIG. 11A is a plan view of an antenna of the present embodiment.
Figure 11B:
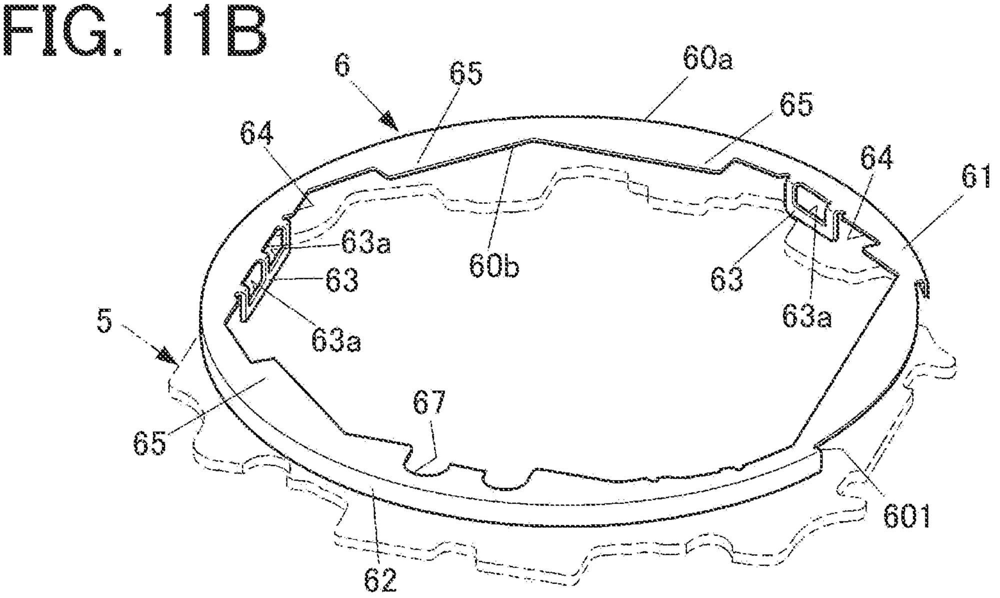
FIG. 11B is a perspective view of the antenna illustrated in FIG. 11A.
Figure 11C:
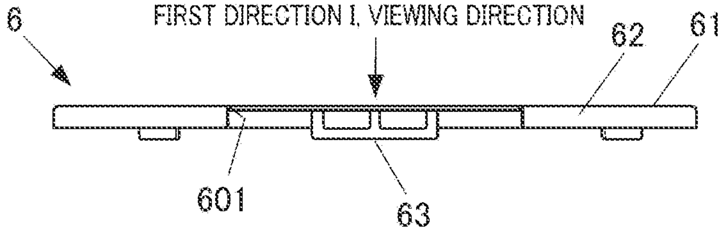
FIG. 11C is a side view of the antenna illustrated in FIG. 11A.

FIG. 11A is the plan view of the antenna 6 of the present embodiment viewed from the first direction. FIG. 11B is a perspective view of the antenna 6. FIG. 11C is a side view of the antenna 6 viewed from a second direction II in FIG. 11A that is different from the first direction I.

As illustrated in FIG. 11A and the like, the antenna 6 (antenna element of the antenna 6) has an almost annular shape having at least an outer peripheral edge 60*a* and an inner peripheral edge 60*b* in the plan view from the first direction I. The material of the antenna 6 is not particularly limited. A metal material having lower electrical volume resistivity is more preferably used in forming high-frequency antenna elements. In some cases, electronic devices such as the timepiece 100 (electronic timepieces, etc.) may have a geomagnetic sensor. Considering the effects on the geomagnetic measurement, a non-magnetic material is more preferably used. From this viewpoint, for example, phosphor bronze is preferably used as the material of the antenna 6 (antenna element). The function as an antenna is realized when high-frequency current flows through this annular antenna 6 (antenna element) and the circuit board 5 (GND board).

As illustrated in FIG. 11A to FIG. 11C, the antenna 6 (antenna element) of the present embodiment includes a top plate 61 whose main surface is visible in the plan view from the first direction I and a side wall 62 that is connected to at least a part of the top plate 61 and extending along the first direction I. The side wall 62 extends from at least a part of the outer edge of the top plate 61 almost in the first direction I. The main surface of the side wall 62 is visible from the second direction II, which is different from the first direction I. Specifically, the antenna 6 includes the annular top plate 61 and the side wall 62 that is hung from the outer edge of the top plate 61 and is visible from the second direction II. In the present embodiment, the second direction II is almost orthogonal to the first direction I and from the outer side of the timepiece 100.

The antenna 6 (antenna element) having a large surface area is advantageous from the viewpoint of radio wave radiation.

The antenna 6 having the top plate 61 and the side wall 62 as in the present embodiment is preferable from the viewpoint of radio wave radiation because it provides sufficient surface area without increasing the diameter of the entire antenna 6, compared to an antenna with only either a flat portion at the top (top plate 61) or only a ring (side wall 62).

As described later, the circuit board 5 is located below the antenna 6. When the antenna 6 (antenna element) and the circuit board 5 are arranged in parallel, capacitive coupling is likely to occur, which has a negative effect on radio wave radiation. In this regard, the side wall 62 is arranged almost orthogonal to the circuit board 5, thus causing less capacitive coupling. This allows the surface area of the antenna 6 (antenna element) to increase while capacitive coupling is suppressed.

However, the inner perimeter (length of one round around the inner peripheral edge) of the antenna 6 (antenna element) having the top plate 61 in addition to the side wall 62 is shorter than that of an antenna consisting of the side wall only (that is, the antenna 6 has a shorter inner diameter). As a result, the electrical distance (electric length) becomes shorter in the antenna 6.

The resonant frequency of the antenna 6 (antenna element) is inversely proportional to the size and length (length of one round around the inner peripheral edge) of the antenna 6 (antenna element). When the electrical length is short, the frequency that is easily received and/or radiated by the antenna 6 tends to be higher than the frequency band that is desired to be received by the antenna 6 of the present embodiment. The desired frequency band is, as mentioned above, the L1 band (around 1.6 GHz), L5 band (around 1.2 GHz), etc., where GNSS (GPS) signals are transmitted.

Therefore, in the present embodiment, by making the shape of the element on the inner diameter side of the antenna 6 not a perfect circle but irregular, the inner perimeter of the antenna 6 (antenna element) is increased, so that the electrical length is increased. Specifically, the distance from the almost center of the annulus (referred to as the "annular center cp") in the plan view from the first direction I varies depending on the position on the inner peripheral edge 60*b*.

Specifically, as illustrated in FIG. 11A, the antenna 6 of the present embodiment has at least one latch 63 at the inner peripheral edge 60*b* and a protruding edge 65 protruding inward of the inner peripheral edge 60*b* than the latch 63.

As illustrated in FIG. 8 and the like, the liquid crystal panel unit 7 constituting the display of the timepiece is accommodated in the device case 1 of the timepiece 100. The basic shape of the inner periphery of the antenna 6 is along the glass of the liquid crystal panel unit 7. The position of the inner peripheral edge in this basic shape is defined as a predetermined "reference position".

Thus, the basic shape of the inner peripheral edge of the antenna 6 (antenna element) corresponds to the shape of the glass of this LCD panel unit 7 and is shaped inward (toward the annular center cp side in FIG. 11A) such that the area of the antenna 6 is increased as much as possible.

The inner peripheral edge 60*b* of the antenna 6 has a "first notch 64" that is notched toward a direction away from the annular center cp than the "reference position". The latch 63 is provided within this "first notch 64" (for example, on the side of the "first notch 64" that is close to the outer peripheral edge 60*a* of the antenna 6).

The protruding edge 65 is a portion that protrudes relatively inward (toward the annular center cp side in FIG. 11A) by having the latch 63 provided in the "first notch 64".

The protruding edge 65 may be at the same position as the "reference position" that is along the glass of the liquid crystal panel unit 7, or may protrude inwardly to a position closer to the annular center cp than the "reference position".

As illustrated in FIG. 11A, the distance d1 from the annular center cp to the protruding edge 65 (for example, the shortest distance from the annular center cp) is shorter than the distance d2 from the annular center cp to the side of the "first notch 64" closest to the outer peripheral edge 60*a* of the antenna 6.

Thus, the first notch 64 and the protruding edge 65 on the inner peripheral edge 60*b* make uneven portions having different distances from the annular center CP, such that the inner perimeter of the antenna 6 (antenna element) is increased, and the electrical length is increased. Thereby, even when the antenna 6 as a whole has a short diameter to reduce its size, the antenna 6 can be easily configured to receive radio waves in the desired frequency band.

The antenna 6 and the device case 1 are locked with the latch 63 on the inner peripheral edge 60*b* of the antenna 6.

As illustrated in FIG. 11A to FIG. 11C, the latch 63 of the present embodiment is arranged in three portions spaced in the peripheral direction along the inner peripheral edge 60*b* of the antenna 6 (antenna element).

As illustrated in FIG. 11B and the like, the latch 63 is a tongue-like piece that is formed on the edge of the first notch 64 at the top plate 61 and bent toward the first direction I and has a latch hole(s) 63*a*. The size of the latch 63 and the latch hole 63*a* also contribute to increasing the inner perimeter of the antenna 6 (antenna element), and the electrical length is expected to be increased.

Figure 12A:
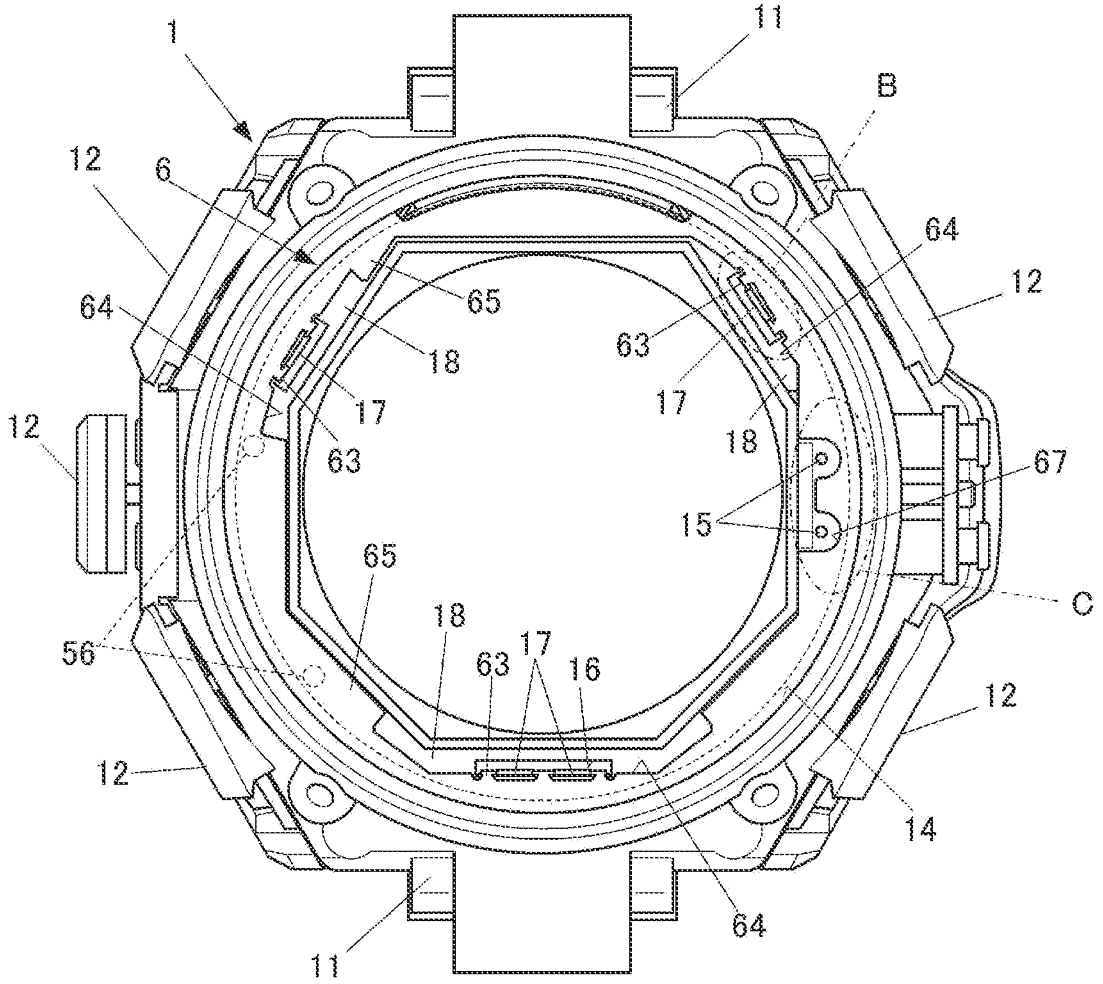
FIG. 12A is a plan view of main parts illustrating a structure for fixing the antenna inside the timepiece of the embodiment.
Figure 12B:
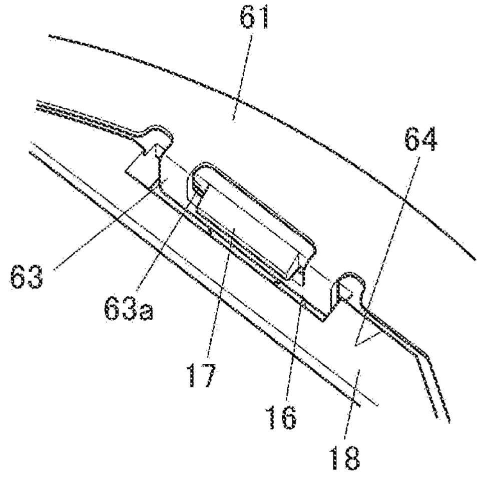
FIG. 12B is an enlarged view of portion B in FIG. 12A.
Figure 12C:
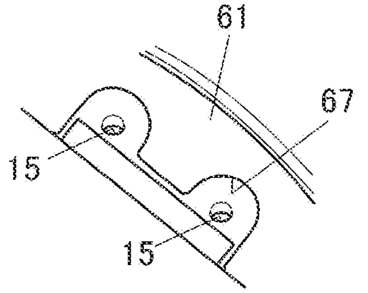
FIG. 12C is an enlarged view of portion C in FIG. 12A.
Figure 13:
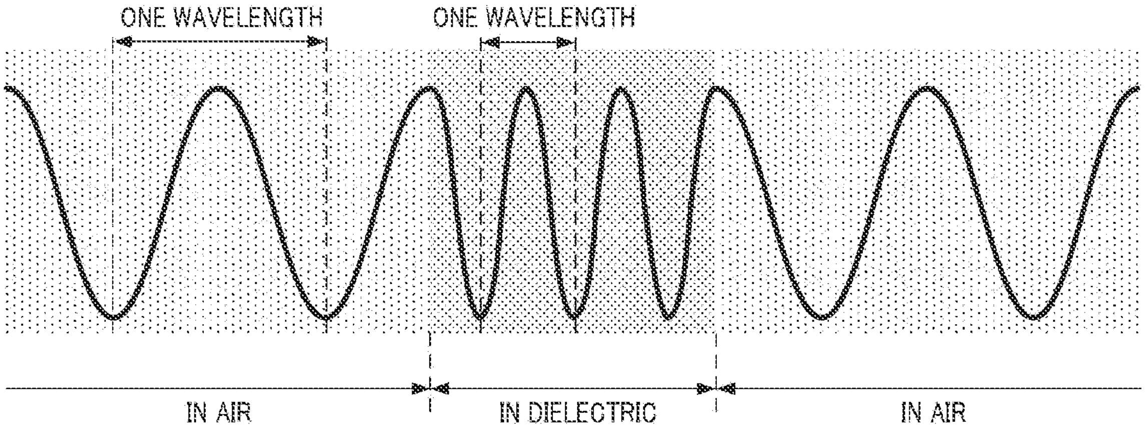
FIG. 13 is an explanatory diagram explaining wavelength shortening of the antenna.

FIG. 12A is the plan view of the device case 1 in which the antenna 6 is incorporated, viewed from the first direction I. FIG. 12B is an enlarged perspective view of main parts at the portion B surrounded by a dashed dotted line in FIG. 12A. FIG. 12C is an enlarged perspective view of main parts at the portion C surrounded by a dashed dotted line in FIG. 12A.

As illustrated in FIG. 12A and FIG. 12B, the device case 1 has a catch protruding inward of the device case 1 at a position corresponding to the latch 63 of the antenna 6. By providing the catch at a position protruding inward of the device case 1 in this way, the device case 1 can be thick and strong at least at that portion.

In the present embodiment, the catch of the device case 1 includes a recess 16 and a hook 17. The recess receives the tongue-shaped latch 63. The hook 17 protrudes from the recess 16 and is locked to the latch hole 63*a* of the latch 63 when the latch 63 is inserted into the recess 16. The hook 17 has some elasticity. When the antenna 6 is placed in the device case 1 from above (along the first direction I) and the latch 63 is inserted into the recess 16, the hook 17 bends somewhat to avoid the inserted latch 63. Once fitted into the latch hole 63*a*, the hook 17 cannot easily be pulled out.

In this way, as the catch on the device case 1 and the latch 63 of the antenna 6 are locked, the antenna 6 is fixed to the device case 1. The configuration of the latch 63 of the antenna 6 and the catch of the device case 1 is not limited to those shown here.

Further, as described above and illustrated in FIG. 10, FIG. 12A, and FIG. 12C, the holes 15 through the device case 1 from top to bottom are formed at portions where the board-panel contact members 46 that connect the solar panel 4 and the circuit board 5 are arranged. In the present embodiment, two board-panel contact members 46 are provided, and two holes 15 are also formed on the device case 1 accordingly.

The notch 67 at the inner peripheral edge 60*b* of the antenna 6 is formed in each of the portions where the holes 15 are formed such that the antenna 6 avoids the portion where the board-panel contact members 46 are arranged. The notch 67 also forms uneven portions at the inner peripheral edge 60*b* of the antenna 6, such that the inner perimeter of the antenna 6 (antenna element) is increased, and the electrical length is increased.

The electronic devices such as the timepiece 100 (electronic timepieces) are expected to be worn on a person's arm or other parts of the body and are generally desired to be miniaturized to improve usability and the like. Therefore, in the present embodiment, the antenna 6 is miniaturized so as to be housed inside the device case 1 as mentioned above.

However, when electronic devices are miniaturized, the arrangement of various parts accommodated inside the device becomes more complex.

In particular, when relatively large parts such as an antenna (antenna element) and a solar panel are miniaturized, the complex arrangement is likely to cause losses due to contact between parts for connector members (springs) and reduce electrical performance such as the antenna efficiency and solar power generation efficiency.

Specifically, for example, when the antenna 6 tends to be arranged close to the board-panel contact members 46 due to the miniaturization of the antenna 6, the members are likely to be electrically coupled, and the respective resistive components cause losses (resulting in a reduction of antenna gain).

In this regard, in the present embodiment, the notch(es) 67 is formed on the antenna 6 such that the antenna 6 avoids the portion(s) where the board-panel contact member(s) 46 are arranged. The board-panel contact members 46 are coil springs provided at portions where the notched 67 are formed and connect the solar panel 4 and the circuit board 5. This suppresses the electrical coupling between the members and the loss caused by respective resistive components (reduction of antenna gain).

Electrical coupling is also likely to result from an electrical loop from solar panel 4, through one of the board-panel contact members 46, the circuit board 5 (connection terminal for the solar panel on the circuit board 5), and the other board-panel contact member 46 in that order, and back to solar panel 4. However, the electrical coupling due to such an electrical loop can also be suppressed by the board-to-panel contact members 46, which are coil springs arranged in the notches 67 and connecting the solar panel 4 and the circuit board 5, and the notches 67, which are formed such that the antenna 6 avoids where the board-panel contact members 46 are arranged.

Further, as illustrated in FIG. 12A and the like, a groove 14 is formed in the device case 1 that receives (accommodates) at least the side wall 62 when the antenna 6 (antenna element) is arranged in the device case 1. As a result, at least a part of the side wall 62 (that is, at least a part of the inner surface, the outer surface, and the bottom surface of the side wall 62) is in contact with the device case 1.

In the present embodiment, the groove 14 has a shape almost corresponding to the side wall 62 of the antenna 6 such that the side wall 62 of the antenna 6 fitted into the groove 14 closely contacts the groove 14 of the device case 1.

When the antenna 6 (antenna element) is miniaturized more, the electrical distance (electrical length) becomes shorter (smaller), thereby the radiation efficiency of the antenna 6 becomes weaker. This causes the problem of the antenna 6 not functioning properly. In this regard, by fitting the side wall 62 of the antenna 6 into the groove 14 of the device case 1 and by making the antenna 6 and the resin device case 1 that is a dielectric in close contact (close contact), the decrease in the radiation efficiency of the antenna 6 can be suppressed.

In addition, antennas with a length and size that better match the frequency and wavelength of radio waves are generally considered to be more efficient (have improved antenna performance).

However, as described above, when the size and length of the antenna 6 (antenna element) are reduced in order to accommodate the antenna 6 in the device case 1, the electrical distance (electrical length) is shortened, and the frequency that is easily received and/or radiated by the antenna 6 tends to be higher than the frequency band that is desired to be received by the antenna 6. The desired frequency band is, as mentioned above, the L1 band (around 1.6 GHz), L5 band (around 1.2 GHz), etc., where GNSS (GPS) signals are transmitted.

In this regard, the antenna 6 (antenna element) surrounded by a dielectric such as a resin material is known to shorten the wavelength of radio waves compared to an antenna 6 (antenna element) in the air, depending on its relative dielectric constant. That is, as in the explanatory diagram illustrated in FIG. 13, a "radio wave wavelength shortening" effect is observed in the dielectric, in which the length of one cycle of the wavelength itself (the length of one wavelength) is shortened.

The device case 1 of the embodiment is a case made of a resin material. More specifically, a resin case in which a substance that increases the relative dielectric constant is blended as a part of the material is preferably used. Therefore, when the antenna 6 (antenna element) is attached as closely as possible to the device case 1, an effective "radio wave wavelength shortening" effect can be achieved. In this way, even when the antenna 6 (antenna element) is miniaturized, it can resonate in a lower frequency band (the desired frequency band such as the above-mentioned L1 band, L5 band, and the like).

Therefore, the shape (width, depth, etc.) of the groove 14 of the device case 1 preferably corresponds to the shape of the side wall 62 of the antenna 6 as much as possible, and the antenna 6 (antenna element) and the device case 1 are configured to closely (closely) fit together when the side wall 62 is fitted into the groove 14. That is, when the side wall 62 is fitted into the groove 14, it is desirable that the inner surface, the outer surface, and the bottom surface of the side wall 62 are in perfect contact with the inner surface of the groove 14.

Further, when the antenna 6 is arranged in the device case 1, at least a part of the lower surface of the top plate 61 is in contact with the device case 1. Here, when the depth of the groove 14 corresponds to the height of the side wall 62 such that fitting of the side wall 62 into the groove 14 leads to an arrangement of the top plate 61 in contact with the upper surface of the device case 1 without lifting, the "radio wave wavelength shortening" effect can be achieved in the same way.

Furthermore, for the same reason, the latch 63 and the catch of the device case 1 are preferably attached (closely adhered) to each other with as little gap as possible at their locking portion.

Also, when the antenna 6 (antenna element) and the device case 1 are attached (closely adhered) to each other, the effect of suppressing the decrease in radiation efficiency of the antenna 6 can be expected as well by the synergistic effect of the antenna 6 and the device case 1 that is a dielectric.

When a dielectric (resin material) fills the area around the antenna 6, the antenna 6 (antenna element) can resonate in a lower frequency band even when the antenna 6 (antenna element) is miniaturized. From this point of view, a dielectric such as a resin material is preferably arranged also on the lower surface side (the back surface side, the side facing the inside of the device case 1, the side facing the inside of the device case 1, the side to which the solar panel 4 is affixed in the present embodiment) of the windshield 3, for example, to fill the gap between the antenna 6 (antenna element) and the windshield 3.

The dielectric (resin material) arranged around the antenna 6 and filling in the gaps is expected to further shorten the wavelength and improve the antenna performance in lower frequency bands (desired frequency bands such as L1 and L5 bands) when a small antenna 6 is used.

The antenna 6 (antenna element) is connected to the circuit board 5 via a board-antenna contact member 56 (antenna contact member).

Figure 14:
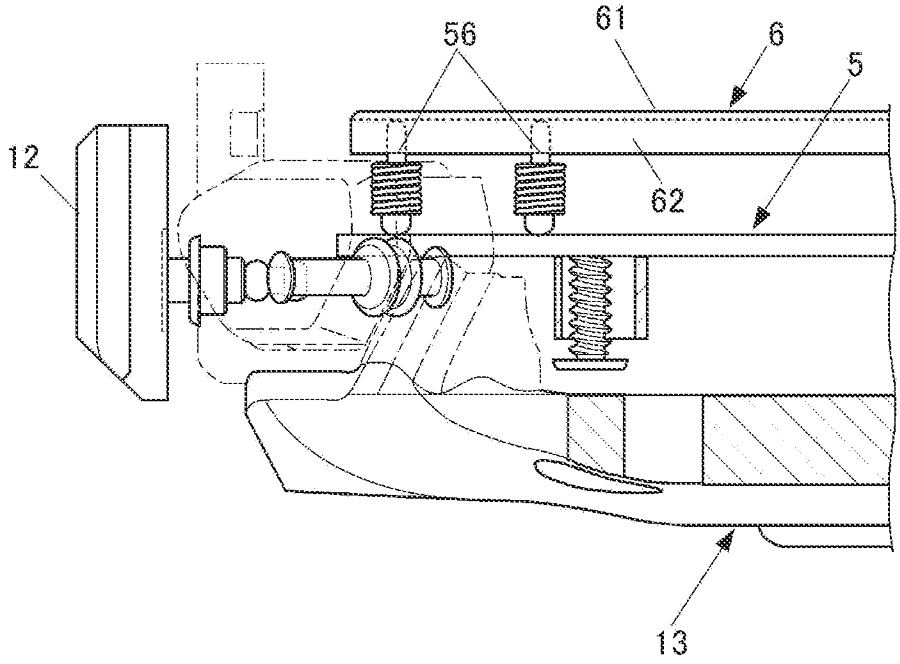
FIG. 14 is a side view of main parts illustrating a connection portion of the antenna and a circuit board of the present embodiment partially in cross section.

FIG. 14 is a schematic side view of main parts illustrating a connection portion of the antenna 6 and the circuit board 5. The board-antenna contact member 56 is, for example, a coil spring or a pogo pin having a spring inside. One end of the board-antenna contact member 56 is in pressure contact with the top plate 61 of the antenna 6 (antenna element), and the other end is in contact with a GPS circuit (not shown) of the circuit board 5.

The top plate 61 of the antenna 6 is in contact with the board-antenna contact member 56 to be connected to the circuit board 5. Therefore, since the contacts regarding the connection of the antenna 6 and the circuit board 5 are located in the thickness direction of the timepiece 100 (vertical direction), the contact pressure at the contacts of the antenna 6 and the circuit board 5 can be sufficiently secured.

The number of the antenna contact members 56 needs only to be one or more, and may be three or more. FIG. 14 and the like illustrates an example of the board-antenna contact members 56 at two respective locations.

The top plate 61 of the antenna 6 may be pushed up by the board-antenna contact member 56 at the point where the board-antenna contact member 56 including the spring strikes. For this reason, as illustrated in FIG. 12A and the like, the position where the board-antenna contact member 56 is arranged is preferably near the locking position where the latch 63 that locks the antenna 6 and the device case 1 is provided.

It is also confirmed that the gain (gain characteristics) of the antenna 6 changes depending on the shape of the antenna 6 (antenna element).

Figure 15A:
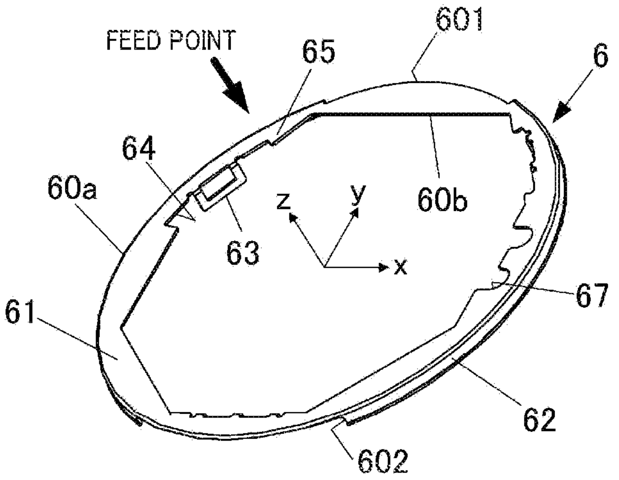
FIG. 15A is a perspective of the antenna of the present embodiment.
Figure 15B:
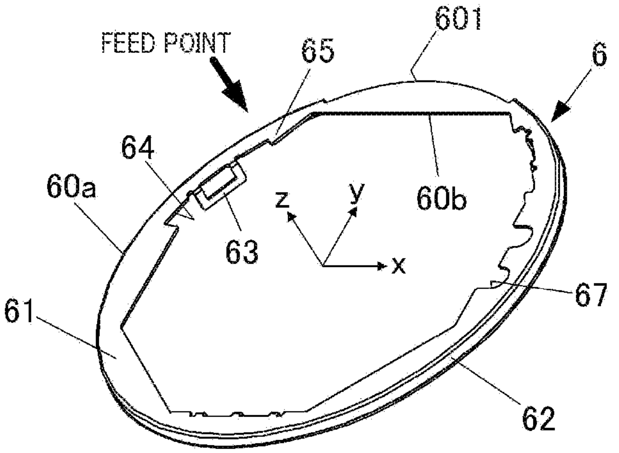
FIG. 15B is a perspective of an antenna of Comparative Example 1.
Figure 15C:
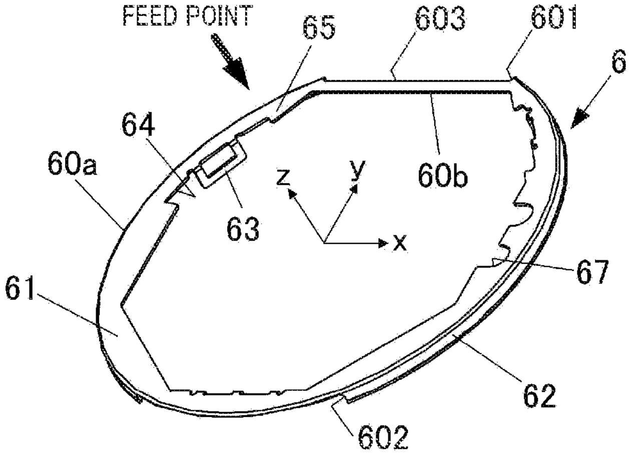
FIG. 15C is a perspective of an antenna of Comparative Example 2.

The (+)x direction of the antenna 6 (antenna element) illustrated in FIG. 15A to FIG. 15C is the direction from the 9 o'clock position to the 3 o'clock position of the timepiece 100, and the (+)y direction is the direction from the 6 o'clock position to the 12 o'clock position. The case where the feeding point is located between the 9 o'clock and 12 o'clock positions as illustrated in FIG. 11A, etc. (i.e., a position rotated 45 degrees counterclockwise from the y direction, between the −x and y directions) is described in the following. For example, when the ±y-direction side of the antenna 6 (antenna element) is cut off, the gain (characteristics of gain) of the antenna 6 changes depending on the cut-off condition.

For example, in FIG. 15A, a part of the side wall 62 on the 12 o'clock side (+y direction) of the antenna 6 is cut off to form a notch 601, and a part of the side wall 62 on the 6 o'clock side (−y direction) is cut off to form a notch 602. The notches 601 and 602 formed on the side wall 62 are referred to as "third notches".

On the other hand, in FIG. 15B, only a part of the side wall 62 on the 12 o'clock side (+y direction) of the antenna 6 is cut off to form a notch 601, and no notch is formed on the side wall 62 on the 6 o'clock side. The antenna (antenna element) having the shape illustrated in FIG. 15B is referred to as "Comparative Example 1".

For example, in FIG. 15C, a part of the side wall 62 on the 6 o'clock side (−y direction) of the antenna 6 is cut off to form the notch 602 (third notch), and a part of the top plate 61 on the 12 o'clock side is cut off to form a notch 603. The notch 603 formed on the top plate 61 is referred to as the "second notch". The antenna (antenna element) having the shape illustrated in FIG. 15C is referred to as "Comparative Example 2".

The antenna 6 used in the present embodiment has a shape illustrated in FIG. 15A having the notches 601 and 602 as the "third notches" formed on the side wall 62 at the 12 o'clock side and 6 o'clock side that are in the ±y directions of the antenna 6.

When the side wall 62 only at the 6 o'clock position on the −y direction side is partially cut out to form a notch 601 in the antenna 6 (antenna element) (in the case of the antenna shape shown in FIG. 15B), the antenna gain decreased in both the L5 band and the L1 band (average value) compared with the case where the side wall 62 at the 6 o'clock position and 12 o'clock position on the ±y direction are partially cut out to form the notches 601 and 602 (in the case of the antenna shape of the present embodiment shown in FIG. 15A).

When the side wall 62 only at the 6 o'clock position on the −y direction side is partially cut out to form a notch 601 and the top plate 61 at the 12 o'clock position on the +y direction is partially cut out to form a notch 603 in the antenna 6 (antenna element) (in the case of the antenna shape shown in FIG. 15C), the antenna gain did not change in the L5 band but decreased in the L1 band (average value) compared with the antenna of the present embodiment having the shape illustrated in FIG. 15A.

In this way, by slightly cutting the edges of the antenna 6 to make it not a perfect circle but shorter in the ±x direction, by making the ±y edges larger, or by changing the metal amount (metal volume) at a position rotated ±45 degrees from the feeding point (feeding position), the shape of the antenna 6 (antenna element) can be adjusted so that the gain is high for the desired frequency band of radio waves.

Where and how to change the antenna 6 to achieve higher gain for radio waves in the desired frequency band can be adjusted depending on various conditions of the surroundings, such as the kind of metal parts arranged around the antenna 6 (antenna element).

The metal amount (metal volume) of the antenna 6 may be adjusted by providing a hole at least at a part of the antenna 6 (antenna element), instead of or in addition to the notch.

As mentioned above, the gain of the antenna 6 depends on various conditions, such as the metal parts arranged around the antenna 6. The board-panel contact member 46 (coil spring (spring)) connecting the solar panel 4 and the circuit board 5 is arranged at a portion corresponding to the notch 67 formed in the inner peripheral edge 60*b* of the antenna 6, as described above.

Although the shape and the like of the board-panel contact member 46 are not particularly limited, the configuration of the board-panel contact member 46 also affects the gain of the antenna 6. Specifically, the gain of the antenna 6 is set based on any of a wire diameter, an effective number of turns, and a length of an elastic part of the coil spring (substrate-panel contact member 46). In other words, the large inductance (calculated inductance) of the coil spring (spring) as the substrate-panel contact member 46 has been confirmed to improve the gain of the antenna 6.

Therefore, in the present embodiment, in the design of specifications (shape, etc.) of the coil spring, the inductance of the coil spring as the board-panel contact member 46 is made as large as possible.

In general, when the effective number [N] of turns and the length [mm] of the elastic part of the coil spring are the same, the smaller the wire diameter [mm] of the spring is, the smaller the inductance (calculated value L) is. Using this characteristic, it was found that as the inductance (calculated value L) decreases, the antenna gain of the right-handed polarization of the L5 band required as the GPS antenna decreases, and the antenna gain of the right-handed polarization of the L1 band (average value) required as the GPS antenna also decreases.

From this, it is confirmed that the gain of the antenna 6 is improved in both the L5 band and the L1 band when the inductance (calculated value L) of the coil spring (spring) as the board-panel contact member 46 is larger. This is considered to be because the larger inductance of the coil spring (spring) as the board-panel contact member 46 blocks the flow of high-frequency current and suppresses the lowering of the gain of the antenna 6.

The solar panel 4 supplies low-frequency alternating (AC) current of a predetermined frequency or less or direct (DC) current. For this reason, even when the inductance of the coil spring (spring) as the board-panel contact member 46 is large, the current generated by the solar panel 4 is supplied to the circuit board 5 without being blocked, and the charging function by the solar panel 4 is not inhibited. The actual coil spring (spring) as the board-panel contact member 46 is preferably designed to meet various conditions, taking into consideration the stress and tension of the spring when contacting the solar panel 4 and the circuit board 5.

Further, as illustrated in FIG. 8, a shield 51 as a protective member is provided on the circuit board 5 in the present embodiment. The shield 51 is a protective member that covers at least a part of the circuit element (electronic component, not shown) on the circuit board 5. The shield 51 is formed in a box shape made of sheet metal, for example, and its side wall is fixed to the circuit board 5.

The method of fixing the shield 51 to the circuit board 5 is not limited. The shield 51 may be soldered directly onto the circuit board 5, or it may be fixed to the circuit board 5 via other metal parts, and the like. In any case, the shield 51 is in direct or indirect contact with the circuit board 5 as ground (GND) at the side wall and has the same potential as the GND.

In the present embodiment, as described above, the antenna 6 (antenna element) has the top plate 61 and the side wall 62 and is advantageous from the viewpoint of radio wave radiation when the surface area is large. For this reason, especially in the plan view from the first direction I, the annular top plate 61 is formed as large as possible by protruding toward the annular center cp. Therefore, the top plate 61 and the circuit board 5 are almost in parallel and facing each other, and when in close proximity, they tend to capacitively couple as if they were "parallel plate capacitors".

In this regard, since the shield 51 covers the circuit element so as to surround it, the surface (upper surface) of the shield 51 is arranged at a position higher than the surface (upper surface) of the circuit board 5. As a result, the surface (upper surface) of the shield 51 is closer to the antenna 6 (antenna element) than the surface (upper surface) of the circuit board 5 itself.

When the shield 51 having the same potential as the ground and the antenna 6 (in particular, the top plate 61) are almost in parallel and close to each other, they tend to be capacitively coupled like a "parallel plate capacitor". This is not preferred because the performance (antenna efficiency) of the antenna 6 is greatly deteriorated when capacitive coupling becomes large.

For this reason, in the present embodiment, the antenna 6 and the shield 51 are arranged so as not to overlap each other in the plan view from the first direction I that is orthogonal to the surface of the circuit board 5. Thus, it is avoided that the antenna 6 and the shield 51 are in an almost parallel position.

Figure 16:
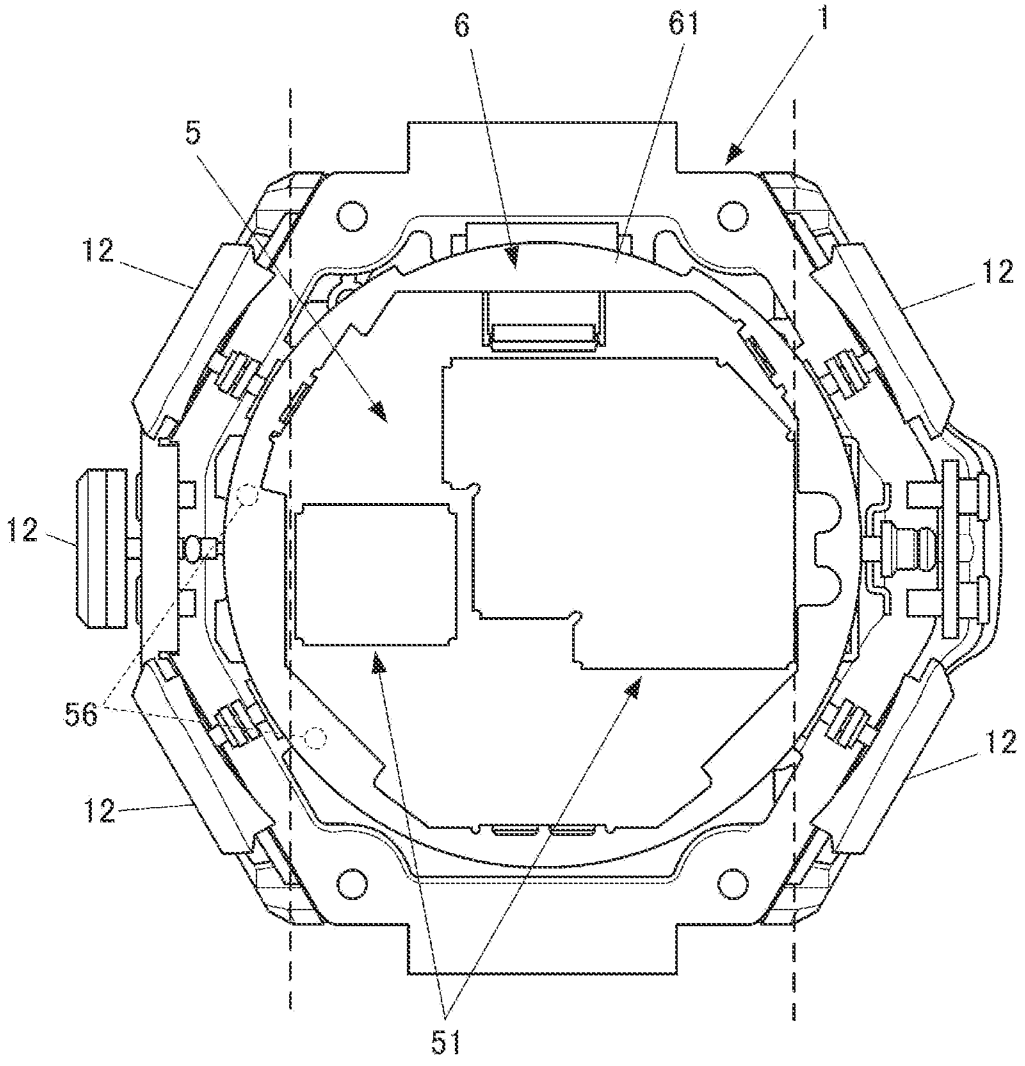
FIG. 16 is a plan view of main parts illustrating an internal configuration of the timepiece of the embodiment.

FIG. 16 is the plan view of a configuration example inside the timepiece (example of arrangement of the shield, etc.) from the first direction I. FIG. 16 shows an arrangement on the circuit board 5 from which the bezel 2, windshield 3, etc. have been removed.

As illustrated by dashed lines in FIG. 16, none of the shields 51 provided on the circuit board 5 are arranged so as to overlap the antenna 6 when viewed in the plan view from the first direction I. More specifically, as described above, the antenna 6 has at least an outer peripheral edge 60*a* and an inner peripheral edge 60*b* in the plan view from the first direction I, but the shield 51 is arranged inside the inner peripheral edge 60*b* in the plan view from the first direction I.

It was confirmed that the antenna efficiency of the circuit board 5 with the shield 51 arranged in this way is almost no worse than that of the circuit board 5 without the shield 51.

The shield 51 arranged in the position illustrated in FIG. 16 does not overlap even the device case 1 in the plan view from the first direction I.

Thereby, it is possible to prevent the capacity coupling between the antenna 6 and the shield 51 more reliably.

The shield 51 as the protective member may have an upper surface that is at least partially inclined with respect to the circuit board 5.

For example, when viewed in the plan view from the first direction I, the upper surface of the shield 51 lower in height is the farther from the center (annular center cp) of the antenna 6 (antenna element) in the plan view from the first direction I. In this case, the antenna 6 and the shield 51 are less likely to cause capacitive coupling.

Therefore, it is preferable to adjust the design when the shield 51 is provided on the circuit board 5. For example, the shape of the shield 51 is preferably designed so as not to overlap the antenna 6. Alternatively, at a portion where the shield 51 needs to be placed due to the presence of a circuit element to be protected, the antenna 6 is preferably designed to be cut off, for example, at a portion overlapping the shield 51 in the plan view from the first direction I so as to avoid the position where the shield 51 is arranged.

Actions

As described above, in the timepiece 100 that is an electronic device in the present embodiment, the solar panel 4, the antenna 6, and the circuit board 5 are assembled into the device case 1 so as to be arranged in this order along the first direction I that is orthogonal to the surface of the circuit board 5.

In order that the circuit board 5 and the solar panel 4 contact each other, the solar panel 4 is arranged so as to overlap the antenna 6 at least in part in the plan view from the first direction I.

The antenna 6 has the notch 67 at the position corresponding to the board-panel contact member 46 that makes contact between the circuit board 5 and the solar panel 4, so that the antenna 6 avoids the portion where the board-panel contact member 46 is arranged. Therefore, the board-panel contact member 46 can be arranged without interfering with the antenna 6.

Effects

As described above, the timepiece 100 that is an electronic device in the present embodiment includes the circuit board 5, the annular antenna 6, the solar panel 4, and at least one board-panel contact member 46 that connects the solar panel 4 and the circuit board 5. The antenna 6 has an annular shape having at least the outer peripheral edge 60*a* and the inner peripheral edge 60*b* in the plan view from the first direction I and has the notch 67 in part. The solar panel 4, the antenna 6, and the circuit board 5 are arranged in this order along the first direction I that is orthogonal to the surface of the circuit board 5. The solar panel 4 is arranged so as to overlap the antenna 6 at least in part in the plan view from the first direction I. The board-panel contact member 46 is arranged at a position corresponding to the notch 67 of the antenna 6.

The electronic device such as the timepiece 100 accommodates various parts. Therefore, when the electronic device is miniaturized, these various parts must be arranged in a complex manner.

In particular, when relatively large parts such as the antenna 6 (antenna element) and the solar panel 4 are miniaturized, the complex arrangement is likely to cause losses due to contact of the board-panel contact member 46 (coil spring and the like) with the antenna 6 and the solar panel 4 and reduce electrical performance such as the antenna efficiency and solar power generation efficiency.

In this regard, in the present embodiment, a path such as the notch 67 is formed as appropriate considering the positional relationship of the parts arranged along the first direction I that is orthogonal to the surface of the circuit board 5. This avoids interference between the parts even when the electronic device is miniaturized, thereby preventing a reduction of electrical performance, such as antenna efficiency and solar power generation efficiency due to the miniaturization.

When the board-panel contact member 46 is a coil spring, the connection structure can be simply configured. Specifically, the board-panel contact member 46 naturally connects the solar panel 4 and the circuit board 5 by the elastic force of the spring simply by being arranged between them.

Also, in the present embodiment, the antenna 6, the board-panel connection member 46, and the circuit board 5 are arranged so as to overlap the solar panel 4 in the plan view from the first direction I. The antenna 6 has the notch 67 to avoid the portion where the board-panel contact member 46 is arranged. Therefore, the board-panel contact member 46 can be easily in contact with the solar panel 4 and the circuit board 5 without interfering with the antenna 6, simply by being arranged almost straight in the thickness direction (vertical direction) of the electronic device such as the timepiece 100.

The timepiece 100 as the electronic device in which the solar panel 4 and the antenna 6 are incorporated can be made smaller as a whole than a timepiece having an exterior member as the antenna and can protect the antenna 6 from external shocks and corrosion, etc.

Even when the antenna 6 is accommodated in the device case 1 to miniaturize the electronic device, each part can be accommodated in the device case 1 so as not to interfere with each other simply by providing a path (notch 67) in the antenna 6 corresponding to the position where the board-panel contact member 46 is arranged. Therefore, it is possible to suppress the reduction of electrical performance such as antenna efficiency and solar power generation efficiency due to the miniaturization of electronic devices.

Although the embodiments of the present disclosure have been described above, it goes without saying that the present disclosure is not limited to such embodiments and can be modified in various ways without departing from the gist thereof.

For example, in the present embodiment, the electronic device is, but is not limited thereto, a timepiece 100.

Electronic timepieces can be widely applied to any device with an antenna in it when used. For example, in addition to various types of smartwatches and sports watches, electronic device that record various types of data along with time, such as heart rate monitors and blood pressure monitors, can be used.

Although some embodiments of the present disclosure have been described above, the scope of the present disclosure is not limited to the above-described embodiments, but includes the scope of disclosure described in the claims and its equivalent range.

The invention claimed is:

1. An electronic device comprising:

a circuit board;

an antenna that has an annular shape in a plan view from a first direction, has at least an outer peripheral edge and an inner peripheral edge, and has a notch at the inner peripheral edge;

a solar panel; and at least one contact member that electrically connects the solar panel and the circuit board, wherein the solar panel, the antenna, and the circuit board are arranged in order from the first direction, and wherein the contact member is at a position corresponding to the notch.

2. The electronic device according to claim 1, wherein the contact member is a coil spring.

3. The electronic device according to claim 2, wherein the antenna has a gain that is set based on at least one of a wire diameter, an effective number of turns, and a length of an elastic part of the coil spring.

4. The electronic device according to claim 1, wherein the solar panel overlaps the antenna in the plan view.

5. The electronic device according to claim 1, wherein the antenna, the contact member, and the circuit board overlap the solar panel in the plan view.

6. The electronic device according to claim 1, wherein the solar panel has an annular shape in the plan view and has at least an outer peripheral edge and an inner peripheral edge.

7. The electronic device according to claim 1, wherein the contact member is not in contact with the antenna.

8. The electronic device according to claim 1, wherein the solar panel supplies direct current or alternating current of a predetermined frequency or less.

9. An electronic timepiece comprising:

a circuit board;

an antenna that has an annular shape in a plan view from a first direction, has at least an outer peripheral edge and an inner peripheral edge, and has a notch at the inner peripheral edge;

a solar panel; and at least one contact member that electrically connects the solar panel and the circuit board, wherein the solar panel, the antenna, and the circuit board are arranged in order from the first direction, and wherein the contact member is at a position corresponding to the notch.

10. The electronic timepiece according to claim 9, wherein the contact member is a coil spring.

11. The electronic timepiece according to claim 10, wherein the antenna has a gain that is set based on at least one of a wire diameter, an effective number of turns, and a length of an elastic part of the coil spring.

12. The electronic timepiece according to claim 9, wherein the solar panel overlaps the antenna in the plan view.

13. The electronic timepiece according to claim 9, wherein the antenna, the contact member, and the circuit board overlap the solar panel in the plan view.

14. The electronic timepiece according to claim 9, wherein the solar panel has an annular shape in the plan view and has at least an outer peripheral edge and an inner peripheral edge.

15. The electronic device according to claim 9, wherein the contact member is not in contact with the antenna.

16. The electronic device according to claim 9, wherein the solar panel supplies direct current or alternating current of a predetermined frequency or less.

* * * * *